United States Patent Office 3,002,024
Patented Sept. 26, 1961

---

3,002,024
BIS-KETENES AND METHOD OF PREPARATION
Alfred T. Blomquist, Ithaca, N.Y., assignor to The B. F. Goodrich Company, New York, N.Y., a corporation of New York
No Drawing. Filed Mar. 12, 1957, Ser. No. 645,397
20 Claims. (Cl. 260—585.5)

This invention relates to new and useful aromatic bis-ketenes and to the methods for their preparation and more particularly pertains to aromatic bis-ketenes having a rigid bridging group of at least 2 carbon atoms between the ketene groups and to methods for preparing the bis-ketenes by dehydrohalogenating the diacyl halides of the corresponding dicarboxylic acids.

The new compounds can be defined as aromatic bis-ketenes in which each ketene group, $>C=C=O$, is attached to a nuclear carbon atom of at least one aromatic hydrocarbon group and in which each ketene group is spaced from the other by a rigid, hydrocarbon bridging group having at least two carbon atoms. Thus, one covalent bond of the beta-carbon atom of each ketene group $$(>\overset{\beta}{C}=\overset{\alpha}{C}=O)$$

is shared with a nuclear carbon atom of an aromatic hydrocarbon ring or in other words the beta-carbon atom of the ketene group is substituted for hydrogen in the aromatic ring and the other covalent bond of each ketene group is shared with a carbon atom of a rigid hydrocarbon bridging group which is defined in greater detail below.

Representative bis-ketene compounds which can be prepared by the process includes those with the following structures:

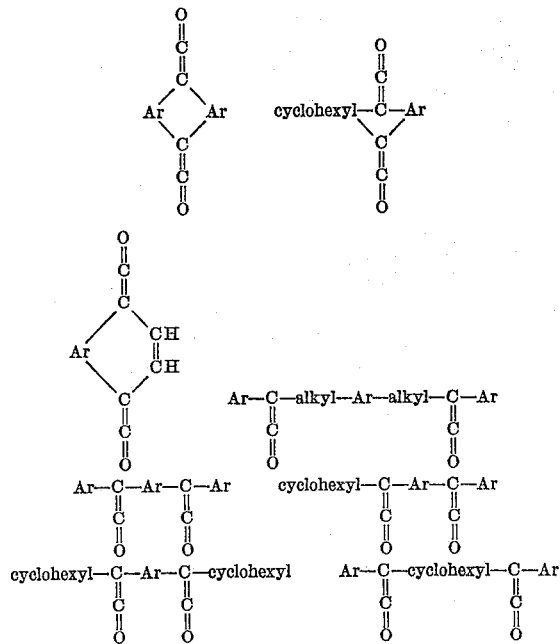

in which the ketene groups are attached to the -1,4- or trans -1,3-positions of the cyclohexyl group,

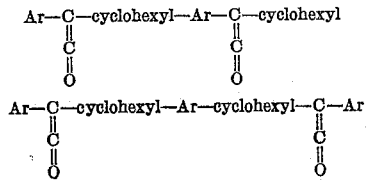

and

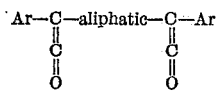

In these formulas Ar represents an aromatic group and lower alkyl substituted aromatic groups having from 1 to 4 alkyl substituents of from 1 to 6 carbon atoms such as tolyl, xylyl, trimethyl phenyl, tetramethyl phenyl, ethyl phenyl, diethyl phenyl, triethyl phenyl, tetraethyl phenyl, mono-, di-, tri-, and tetrabutyl and isobutyl phenyl, naphthyl, alkyl substituted naphthyl, anthracyl, alkyl substituted anthracyl and the like. Cyclohexyl includes a cyclohexyl group and alkyl substituted cyclohexyl groups having from 1 to 4 alkyl substituents as enumerated above. The term aliphatic includes an alkylene group having 4 carbon atoms or more or an acetylenically unsaturated hydrocarbon group having at least 2 carbon atoms or an ethylenically unsaturated hydrocarbon group having at least 2 carbon atoms for the trans isomers and 5 to about 18 carbon atoms for cis isomers.

The term rigid bridging group therefore includes those groups defined herein as -Ar-, -cyclohexyl-Ar-cyclohexyl-, -cyclohexyl-Ar-, 1,4-cyclohexyl, 1,3-trans cyclohexyl, -cyclohexyl-Ar-cyclohexyl-, trans $(CH_2)_n-\overset{H}{C}=\overset{H}{C}-(CH_2)_n$ $-C\equiv C-$, $-(CH_2)_n-C\equiv C-(CH_2)_n-$ where $n$ is 1 to about 8, $-(CH_2)_{4-18}$, and an ethylenically or acetylenically unsaturated hydrocarbon group of from 4 to about 18 carbon atoms.

Typical compounds which can be prepared include those having the following general structures:

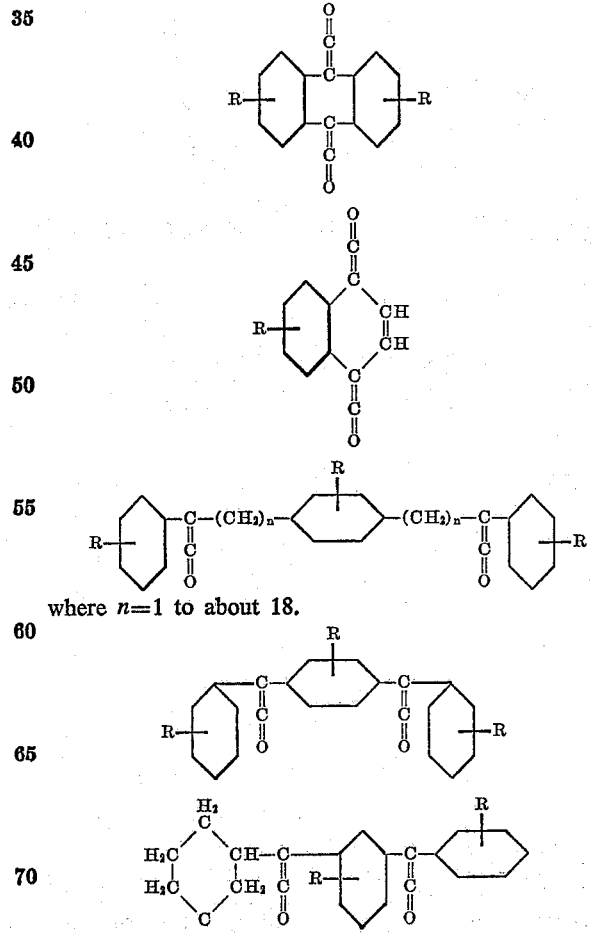

where $n=1$ to about 18.

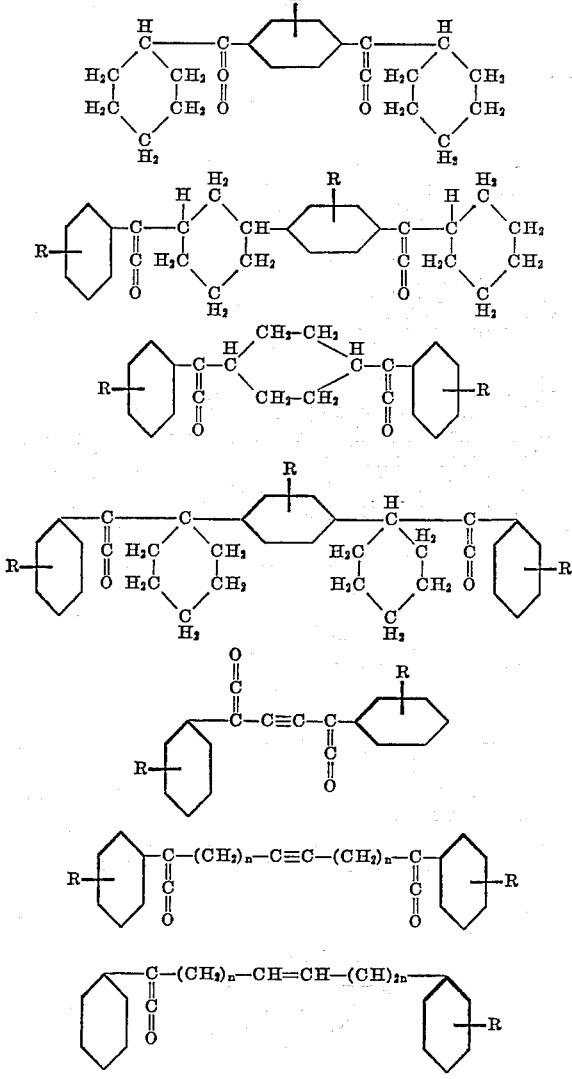

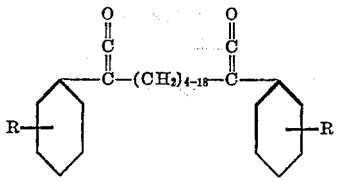

where *n* is 1 to 8 if the ketene groups are trans and 4–8 if cis.

[structure with (CH₂)₄₋₁₈]

in which R represents from 1 to 5 lower alkyl groups. For the purposes of brevity, compounds having alkyl substituents on the phenyl or cyclohexyl groups and naphthyl groups have not been shown in detail although they are contemplated as part of this invention.

The bis-ketenes are prepared by dehydrohalogenating a bis-acyl halide, particularly the acyl chlorides, bromides and iodides, of a dicarboxylic acid, in which the carbon atom beta to each carboxyl group is attached to a nuclear carbon of at least one aromatic hydrocarbon group and to a carbon atom of a rigid hydrocarbon bridging group which contains at least two carbon atoms. The dehydrohalogenation reaction is preferably effected in the presence of a dehydrohalogenation agent at low temperatures from about −80° C. to about 60° C., but it can be effected at temperatures up to about 100° C. for the bis-ketenes which have much steric hindrance that prevents interaction between the ketene groups on the same molecule. Because of the high degree of reactivity of the bis-ketenes their preparation is best carried out in the presence of an inert diluent, under substantially anhydrous conditions and preferably under an inert atmosphere.

The dehydrohalogenating agents are preferably tertiary aliphatic amines such as trimethylamine, triethylamine, tripropylamine, tributylamine, triamylamine and other saturated aliphatic tertiary amines. However other tertiary amines such as dimethylaniline, diethylaniline, N-ethylpiperidene, N-methylpiperidene, diethylmethylamine, diethylpropylamine and pyridine are also useful. Of these the low molecular weight aliphatic tertiary amines, such as triethylamine and tripropylamines are preferred.

The inert diluents include saturated aliphatic ethers, esters, hydrocarbons, halogenated aliphatic hydrocarbons, liquid aromatic hydrocarbons and halogenated liquid aromatic hydrocarbons. Exemplary diluents are diethyl ether, di-n-propyl ether, di-n-butyl ether, ethyl propyl ether, methyl acetate, ethyl acetate, n-propyl acetate, n-butyl acetate, the liquid alkyl esters of propionic and butyric acids, hydrocarbons including cyclohexane, pentane, heptane, octanes and other liquid aliphatic hydrocarbons and their halogenated derivatives, and benzene, toluene, xylene and their liquid halogenated derivatives.

The bis-acids, which can be converted to bis-acyl halides, can be prepared by one of several methods. Thus, hydrocarbons containing only fused aromatic rings, such as naphthalene, anthracene and higher fused aromatic hydrocarbons can be reacted with an alkali metal to form organo-alkali metal compounds having two alkali metal groups per molecule. These are then reacted with dry $CO_2$ to form salts of the bis-acids. The bis-acids in turn can be converted to bis-acyl halides.

An alternate method for preparing the bis-acids is to react a bis-halide, such, for example, as a xylylene dihalide or other dihalo-dialkyl substituted aromatic compounds in which the halogen is fluorine, cholrine, bromine or iodine with a mono-aromatic or cyclohexyl substituted malonic acid ester in the presence of an alkaline catalyst or condensing agent, then converting the condensation product to the bis-acid. The following specific method is representative of the procedure for preparing bis-acids of the general formulas:

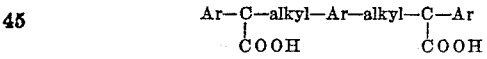

and

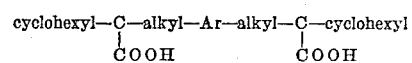

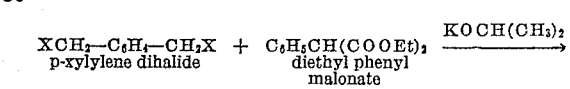

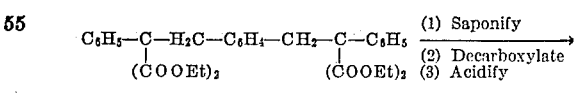

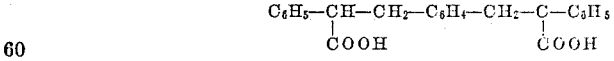

A third method for preparing the bis-acids is by utilizing a Wolf-Kishner reduction of benzoyl diaryl methane to form compounds having two methylene groups each connected to two aryl nuclei. The methylene groups can be reacted with an alkali metal and then carbonated to form the bis-acid salt. Bis-acids containing an acetylenic group can be prepared by reacting an alpha-halo-carboxy acid ester with disodium acetylide and hydrolyzing the ester. For example,

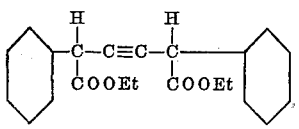

can be prepared by reacting 2 moles of ethyl alpha-bromophenyl acetate with one mole of disodium acetylide in an inert liquid diluent, such as dry ether.

The conversion of the bis-acids or their alkali metal salts to bis-acid halides can be effected with thionyl chloride, bromide, or iodide, sulfuryl chloride, bromide or iodide, $PCl_3$, $PBr_3$, $PI_3$, $POCl_3$, $POBr_3$, $POI_3$, $PCl_5$, $PBr_5$ or $PI_5$. Acyl fluorides can be prepared from the acyl chlorides, bromides or iodides by reaction with $NaHF_2$, $ZnF_2$ or $SbF_5$. $PCl_5$ is preferred as an acyl halide forming agent because of its ready availability and because of the ease of separation of the bis-acyl halides from the remaining reaction products.

The bis-acyl halides which can be dehydrohalogenated to bis-ketenes include the following exemplary compounds:

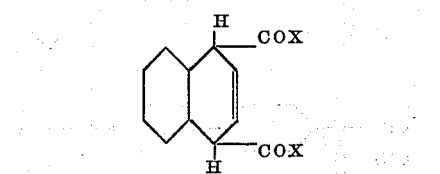
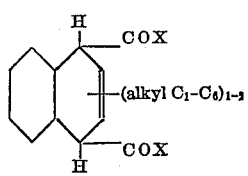
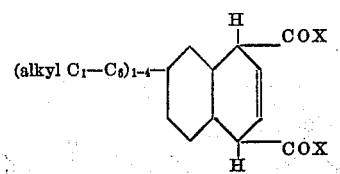
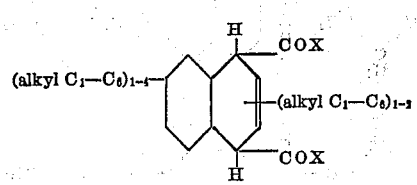
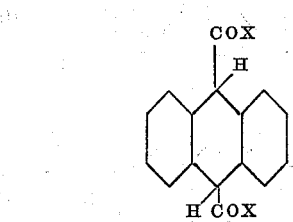
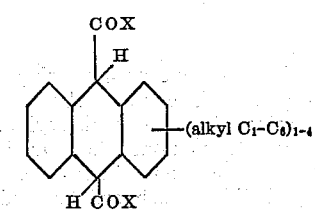
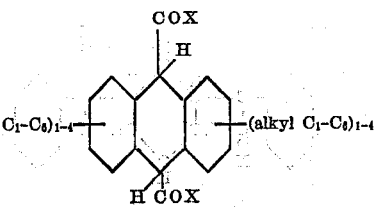

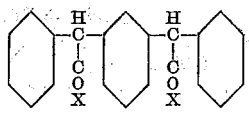
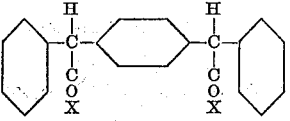
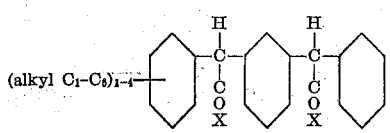
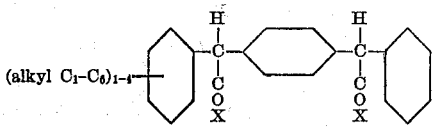
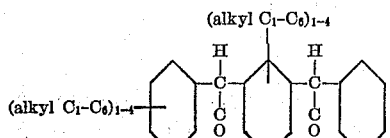
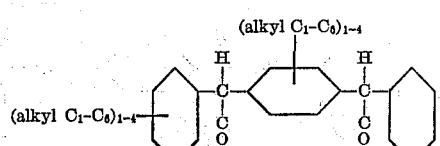
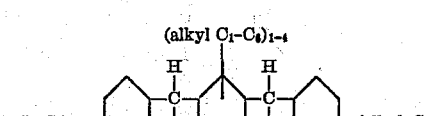
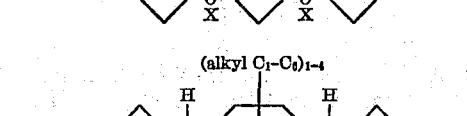

and the corresponding derivatives in which one or more ring is alkylated with one or more alkyl groups having from 1 to 6 carbon atoms as described above. In the bis-ketenes derived from these diacyl halides, the beta-carbon atom of each ketene group is attached to two aryl groups and each ketene group is separated from the other by at least two carbon atoms.

Other bis-halides which can be used to prepare bis-ketenes include:

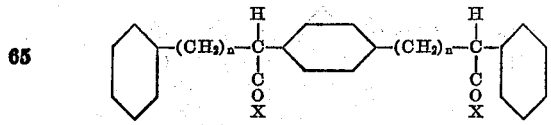

in which $n$ is an integer of from 1 to about 18.

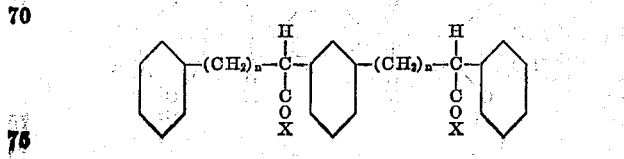

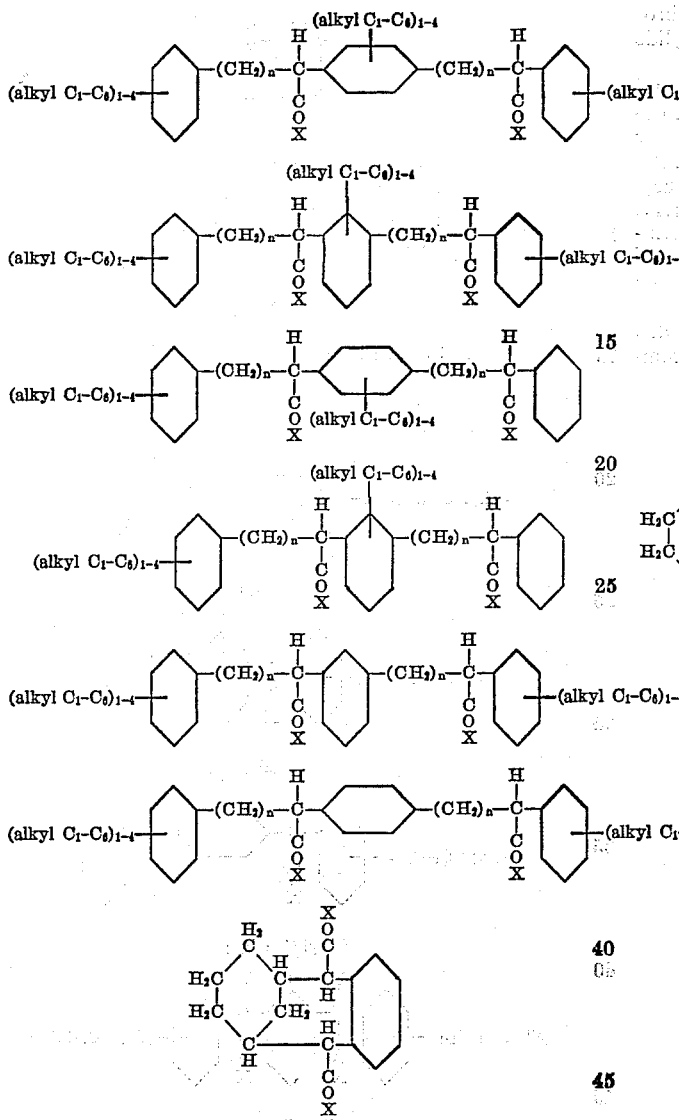

and also bis-acyl halides in which the cyclohexyl group or aryl group has one to 4 lower alkyl groups attached to the ring, and bis-acyl halides in the aryl portion of the molecule is a polynuclear aryl ring such as naphthyl, phenanthryl, anthracyl etc. The beta-carbon atom of each ketene group of the bis-ketene made from these aryl halides is attached to a nuclear carbon atom of a monocyclic aromatic group and to an alkarylene group and the ketene groups are separated from each other by at least two carbon atoms. Included also are lower alkyl substituted derivatives in which either the cyclohexyl ring, or either or both aryl nuclei have one or more lower alkyl groups on the molecule, and in which the aryl nuclei are fused aromatic nuclei, such as naphthyl, phenanthryl, anthracyl, etc.;

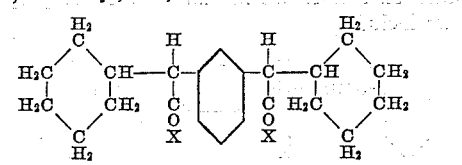

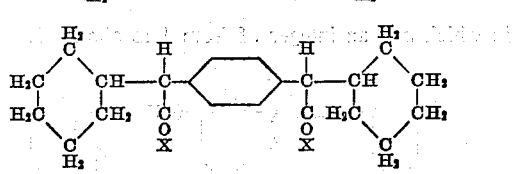

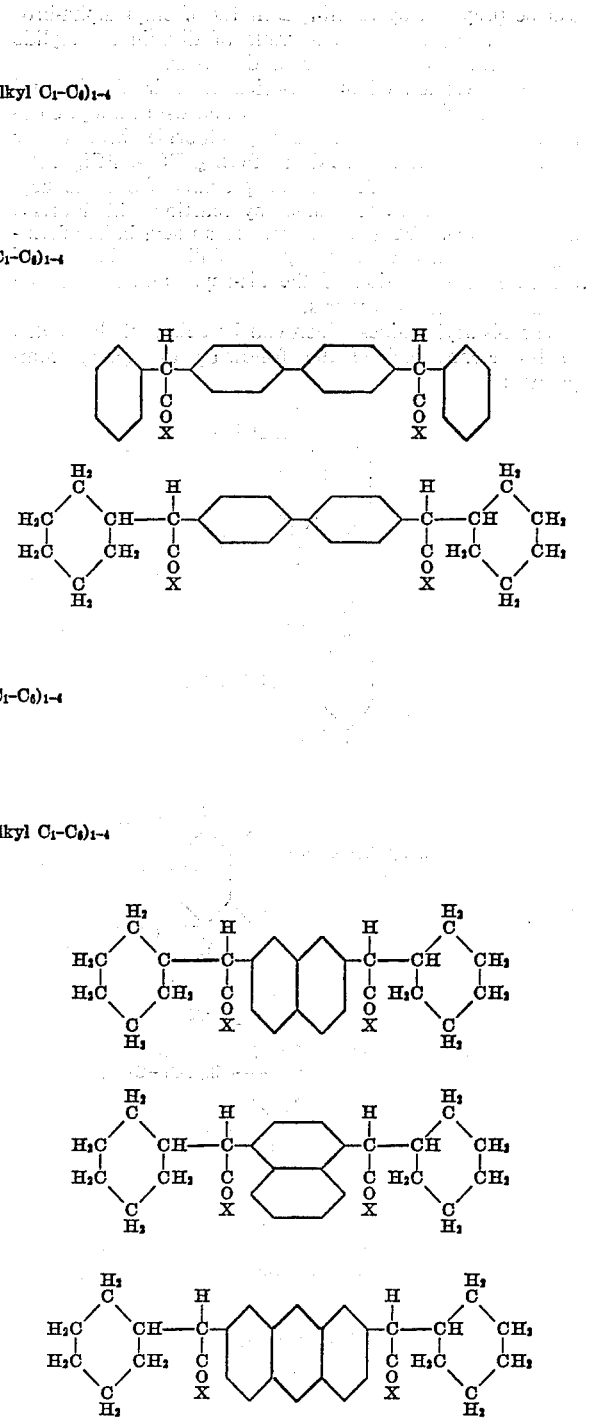

and derivatives in which one or more rings is alkylated with a $C_1$–$C_6$ group. The beta-carbon atom of each ketene group derived from these bis-acyl halides is attached to a nuclear carbon atom of a cycloaliphatic group and to a nuclear carbon atom of an arylene group.

Other bis-acyl halides which can be used to prepare bis-ketenes are:

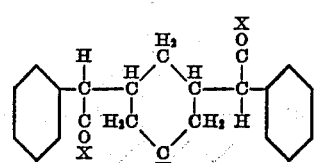

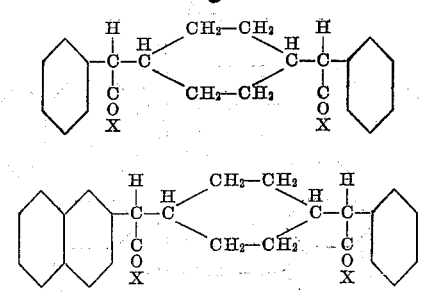
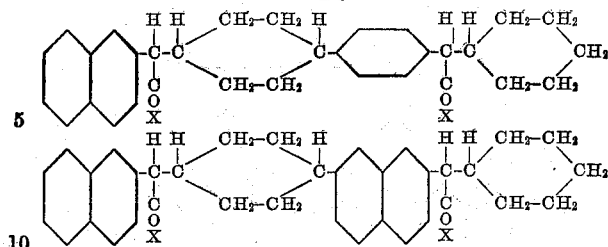
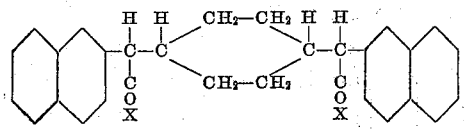
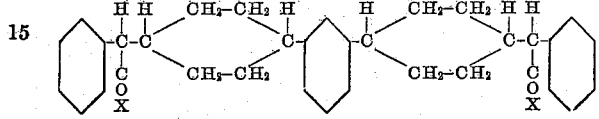

and derivatives in which the aromatic or cyclohexyl nuclei are substituted with one or more alkyl groups having from 1 to 6 carbon atoms, as described above;

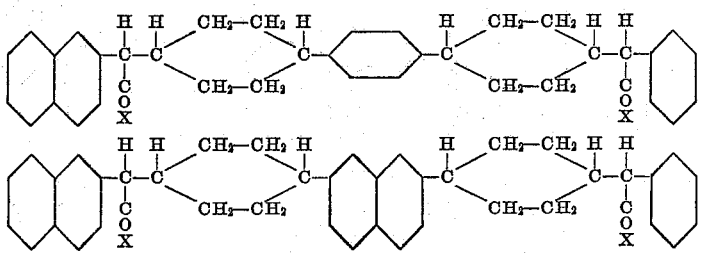

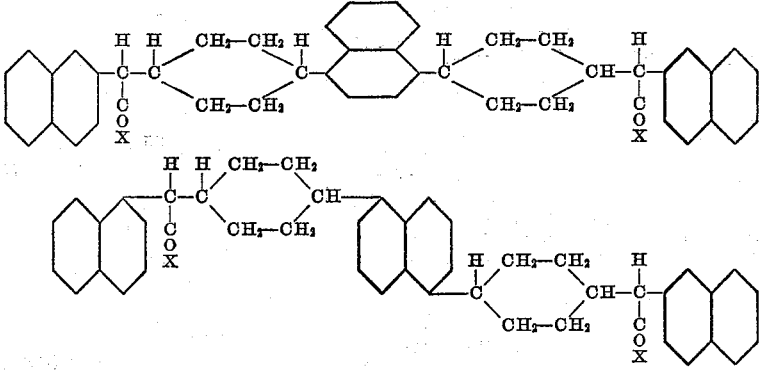

and derivatives in which the cyclohexyl or aryl groups are alkylated with one or more alkyl groups having from 1 to 6 carbon atoms, as shown above. Each ketene group of the bis-ketenes, derived from these bis-acyl halides is attached through its beta-carbon atom to a nuclear carbon atom of an aryl nucleus and to a nuclear carbon atom of a cycloaliphatic hydrocarbon group.

Also included among the bis-acyl halides that can be used to form bis-ketenes are:

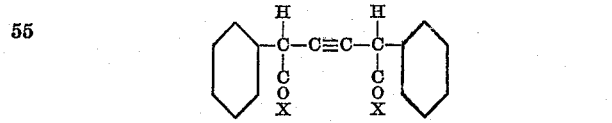

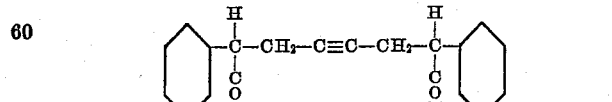

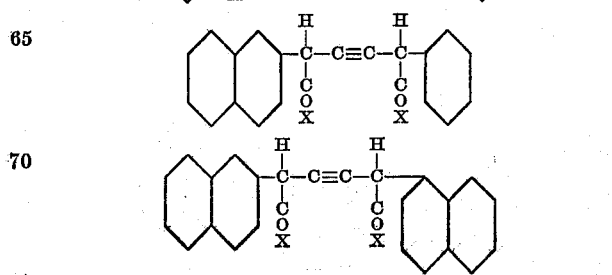

and derivatives which have lower alkyl substituents on the aryl or cyclohexyl nuclei, as described above;

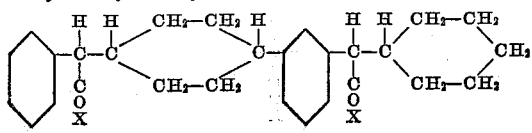

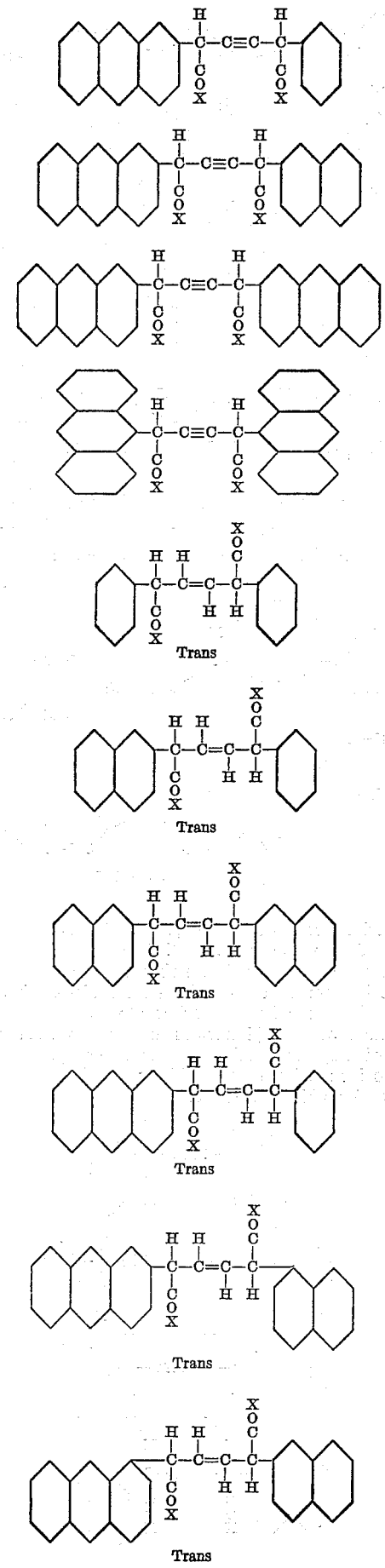

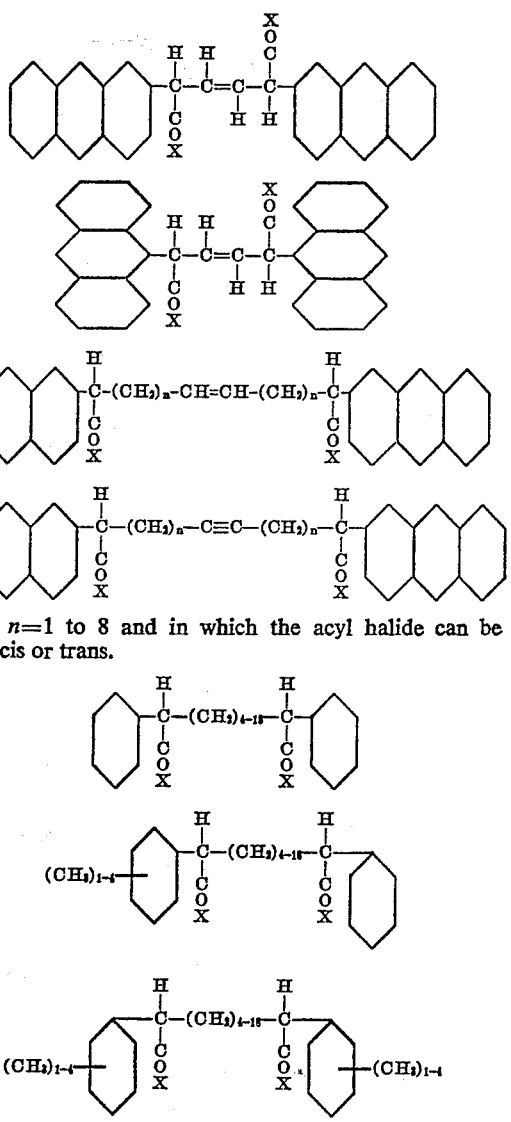

where $n=1$ to 8 and in which the acyl halide can be either cis or trans.

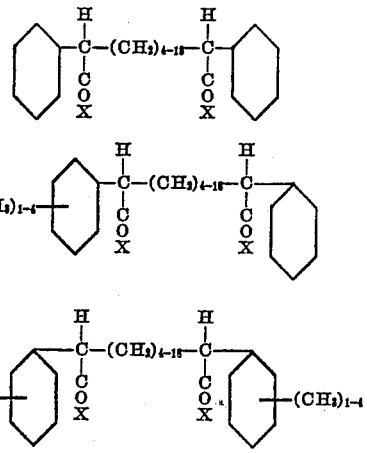

and other alpha-alpha'-aryl substituted saturated aliphatic dicarboxylic acids. The aryl group is preferably monocyclic but it can be a polycyclic nucleus, either fused or non-fused and the alkyl substituents on the aromatic rings can have from 1 to about 6 carbon atoms.

In the above formulas the groups having one or more

rings are aromatic hydrocarbon groups.

In addition to the bis-acyl halides enumerated above, those formed by reacting hydrocarbons, such as ditetralyl, 2,6'-ditetralyl, truxene, tetraphenyl truxane and 2,3,6,7-dibenzanthracene 9,10-diyl, diindene and others with an alkali metal, carbonation of the alkali metal organo compound, to form the acid or its salt and converting the acid or its salt to the halide with a pentahalo phosphorous compound can also be used.

The bis-ketenes that are formed have the same configuration as the bis-acyl halides with the exception that each

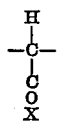

group is converted to a $$-\overset{\overset{O}{\|}}{\underset{\underset{O}{\|}}{C}}-$$

group by dehydrohalogenation.

The temperature at which dehydrohalogenation is to be effected will vary somewhat with the various groups of bis-acyl halides, because of the degree of reactivity of the bis-ketene desired.

The examples which follow are intended to be illustrative and are not to be construed as limitations on the invention. In each example parts are given by weight, except where specifically stated otherwise.

*Example I*

Sodio-anthracene was prepared by reacting 13.8 parts of sodium and 50 parts of anthracene in 1500 ml. of anhydrous diethyl ether. The reaction was permitted to proceed under a blanket of dry nitrogen at room temperature for 4 hours. Dry carbon dioxide was bubbled into the sodio-anthracene mixture for about an hour at which time the deep violet color disappeared. The sodium salt was separated by filtration. Unreacted sodium was removed, the salt was washed with ether and dried in a vacuum desiccator. The dry salt was then dissolved in water and acidified with concentrated HCl in the presence of ethyl acetate. The organic layer was separated and dried with anhydrous magnesium sulfate. The 9,10-dihydroanthracene-9,10-dicarboxylic acid which was concentrated in the organic layer was then recovered. It had a M.P. of 285–290° C., with decomposition, and a neutralization equivalent of 135.

18 parts of 9,10-dihydroanthracene-9,10-dicarboxylic acid and 29 parts of PCl₅ were added to 100 ml. of dry benzene. The reaction mixture was protected from atmospheric moisture and heated to 50–60° C. for about 2 hours. The benzene and POCl₃ were removed by distillation. The residue was taken up in a mixture of benzene and hexane and recrystallized to yield a product with a M.P. of 154–160° C.

1.5 parts of the diacyl chloride of 9,10-dihydroanthracene-9,10-dicarboxylic acid were dissolved in 20 ml. of deoxygenated dry benzene in a dry nitrogen atmosphere and added to a solution of 1.01 parts of triethylamine in 20 ml. of deoxygenated dry benzene in a dry nitrogen atmosphere. The dehydrohalogenation reaction was substantially complete after about 5 hours. The intense red solution was warmed to 60° C. and filtered under dry nitrogen. The benzene solution was concentrated under vacuum in a nitrogen atmosphere, while the flask was kept in an ice bath.

The anthraquinoketene

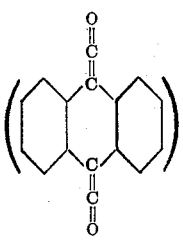

crystallized as orange red needles. These were collected under dry nitrogen and dried in a vacuum desiccator. This bis-ketene has a decomposition point of about 150° C. but no melting is clearly apparent below 300° C. It shows a very strong infrared absorption band at 4.8 mu.

| Analysis | C | H |
|---|---|---|
| Calcd. for $C_{16}H_8O_2$ | 82.75 | 3.47 |
| Found | 82.94 | 3.52 |

A solution of anthraquinoketene in deoxygenated dry isooctane had an ultraviolet spectrum with the following maxima: λ max. (mu) 216 (log ε 4.70); 252 (log ε 4.34); 256 (log ε 4.36); 288 (log ε 4.35); 320 (log ε 3.50); 395 (log ε 2.77). Potassium permanganate in dry acetone converts the bis-ketene to anthraquinone.

The bis-ketene either in the solid state or in solution in the presence of oxygen is polymerized to a yellow material with λ max. at 5.58 and 5.75 mu and a M.P. of about 175–178° C. with decomposition. The polymeric substance is highly insoluble in common organic solvents, but it dissolves gradually in warm or dilute aqueous sodium hydroxide solution. Acidification of the alkaline solutions yields a precipitate of anthracene-9,10-dicarboxylic acid.

*Example II*

Beta,beta′-p-phenylene - bis(alpha - phenylpropionyl chloride) was prepared by reacting 2 moles of monophenyl substituted diethyl malonate with p-xylylene diodide in the presence of potassium isopropoxide to form a compound having the structure

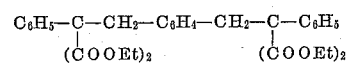

Hydrolysis of the ester and conversion of the tetraacid to the diacid was effected with aqueous KOH. The solution was then acidified with HCl to precipitate the free diacid which was recovered and dried. The beta,beta-para - phenylene - bis(alpha-phenylpropionic acid) was a white solid which melted at 224–29° C. and had a neutralization equivalent of 191.6. The diacid was converted to the diacyl halide by reaction with PCl₅ in benzene. The diacyl halide was a white crystalline solid which melted at 153–158° C.

Para-xylylene bis(phenylketene) was prepared by adding 1.4 ml. of triethylamine dissolved in 10 ml. of deoxygenated, dry benzene in a dry nitrogen atmosphere to a mixture of 2.1 parts of beta,beta′-p-phenylene-bis(alpha-phenylpropionyl chloride) in 35 ml. of dry, deoxygenated benzene in a dry nitrogen atmosphere. After about 2½ hours at room temperature the mixture was heated at 60–70° C. for 15 minutes. The triethylamine hydrochloride was removed by filtration under dry nitrogen. The yellow filtrate was concentrated under reduced pressure until most of the benzene was removed, leaving a lemon-yellow pasty solid which had a strong infrared peak at 4.78 mu.

This bis-ketene was purified by sublimation at about 0.1 mm. pressure, at a temperature of 120–150° C. The decomposition point was 85–90° C. at atmospheric pressure. The purified yellow crystalline material also had a strong infrared absorption peak at 4.78 mu.

Para-xylylene bis(phenylketene) is not as sensitive to oxygen as the anthraquinonoketene of Example I. In place of beta,beta′-p-phenylene-bis(alpha-phenylpropionyl chloride) compounds in which the phenyl groups have 1 or more alkyl substituents of from 1 to 6 carbon atoms can be used.

*Example III*

Para-dibenzylbenzene was prepared by reacting a benzoyl chloride-AlCl₃ complex with diphenylmethane in CS₂. The hydrazine of the p-benzoyldiphenylmethane was prepared and reacted with KOH, to form the desired hydrocarbon. The para-dibenzylbenzene was reacted with potassium and dry tetrahydrofuran in a nitrogen atmosphere and the metallo-organic hydrocarbon was carbonated with dry CO₂ until it was evident that no CO₂ was being absorbed. The disodium salt of alpha,alpha′-p-phenylene-bis(alpha-acetic acid)

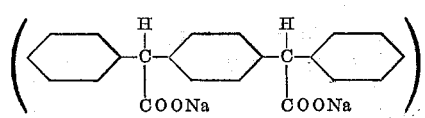

was recovered by filtration. The salt was dissolved in water and acidified with HCl. The free diacid was recovered, dried, and converted to the diacyl chloride with PCl₅. A solution of the diacyl halide was prepared with dry deoxygenated benzene in a dry nitrogen atmosphere and triethylamine also dissolved in dry deoxygenated benzene in a dry nitrogen atmosphere was added. The mixture was permitted to stand at room temperature for about 3 hours, after which it was warmed to 70–80° C. for about 15 minutes and allowed to cool.

The mixture was filtered under dry nitrogen to remove the triethylamine hydrochloride. The benzene was then removed under reduced pressure, leaving an orange-red amorphous solid, which was dissolved in a benzene hexane mixture and crystallized therefrom.

*Example IV*

A mixture of 192 parts of naphthalene and 33 parts of sodium in 1500 ml. of dry, deoxygenated ethylene glycol dimethyl ether was prepared and the reaction was allowed to proceed at room temperature for about 3 hours. Thereafter, dry CO₂ was introduced into the mixture at −65° C. The carbonation was completed in about 4.5 hours. The major product formed was the disodium salt of 1,4-dihydro-1,4-dicarboxy naphthalene. A small amount of disodium 1,2-dihydro-1,2-dicarboxy naphthalene was also formed.

The 1,4-dihydro-1,4-dicarboxy naphthalene was reacted with a slight excess of PCl₅ in dry benzene. The diacyl halide was then recovered. 1.5 parts dissolved in 30 ml. of anhydrous diethyl ether were dehydrohalogenated in a dry nitrogen atmosphere at Dry Ice temperature (−70 to −80° C.) with 1.7 ml. triethylamine dissolved in 30 ml. of anhydrous ether. The bis-ketene

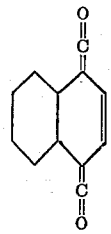

forms as a dark green solid under these conditions. On warming the slurry, the bis-ketene polymerizes to a yellow solid before reaching room temperature. Addition of absolute methanol to the slurry at −77° C. results in the formation of a yellow-brown dimethyl ester. Alkyl substituted naphthalenes as defined above can be used in place of naphthalene, providing that the 1 and 4 positions on the molecule have only hydrogen atoms.

For the purposes of brevity other bis-ketenes which can be prepared by dehydrohalogenation of corresponding bis-carbonyl or acid-halides, by following the procedures mentioned above are listed in tabular form.

| | Diacyl halide | Bis-ketene |
|---|---|---|
| V | (structure) | Cyclohexyl–C(=O)–⟨C₆H₄⟩–C(=O)–cyclohexyl |
| VI | (structure) | (structure) |
| VII | (structure) | (structure) |
| VIII | (structure) | (structure) |
| IX | (structure) | (structure) |
| X | (structure) | (structure) |
| XI | (structure) | (structure) |

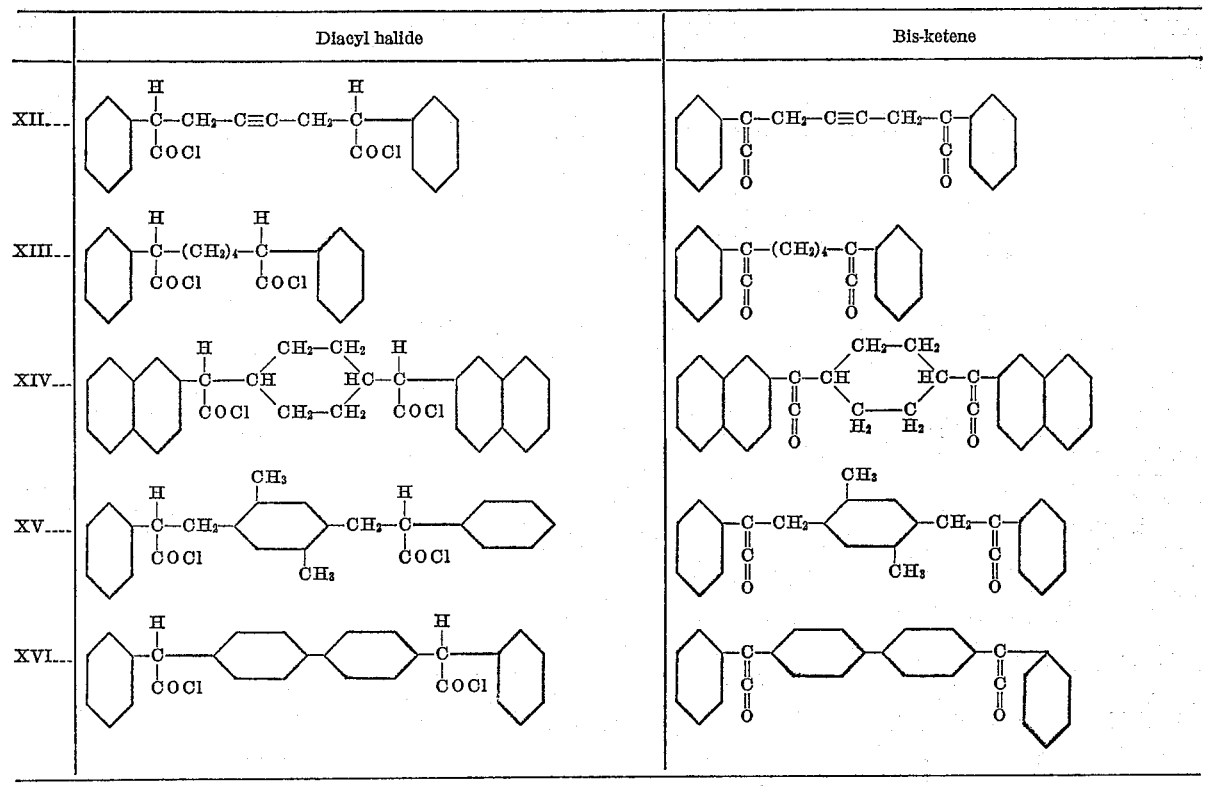

In each of the above examples the aromatic or the cycloaliphatic ring can have one or more alkyl substituents of from 4 to 6 carbon atoms.

Although acyl chlorides and bromides are used for exemplary purposes, the iodides and fluorides react similarly. Since the chlorides and bromides are readily obtained they are preferred. It is to be understood that acyl chlorides can be used in place of the acyl bromides of the specific examples.

The bis-ketenes are very reactive compounds and have utility for preparing a wide variety of derivatives with compounds having an active hydrogen atom and they are also useful for preparing polymers with polyalcohols or polyamines, or they can be used as chain extenders for hydroxy terminated polyesters or for amine terminated polymers.

The following derivatives were prepared with anthraquino-ketenes in dry benzene, under a nitrogen atmosphere, but it is to be understood that all the remaining bis-ketenes will undergo the same reactions as those described below.

| Reactant | End product | |
|---|---|---|
| Methanol | Dimethyl ester | M.P., 137–158° C. |
| Aniline | Dianilide | M.P., 232–255° C. |
| KMNO$_4$ | Anthraquinone | |
| Ethylene glycol | Polyester | M.P., 140° C. |
| Decamethylene glycol | ----do---- | Viscous liquid. |
| Hydroquinone | ----do---- | M.P., 198–200° C. |
| Polyethylene glycol | Chain extended polyethylene glycol. | Strong rubbery films. |

The polyesters were prepared at reflux temperature and then the benzene was permitted to distill slowly. The oil bath temperature was finally raised to 160° C. and the last traces of benzene were removed under a vacuum of 0.8 mm. The solid polyester from ethylene glycol was soluble in benzene and chloroform, insoluble in ether, acetone and methanol. Films can be formed by evaporation of the benzene solution. The solid resin can be used for making molded articles.

The polyester made with hydroquinone was also soluble in benzene, but insoluble in ether.

Diamines, such as ethylenediamine or higher molecular weight diamines form polymeric polyamides.

With amino alcohols such as ethanolamine polyester-polyamides are formed.

Dimercaptans form polythioesters, urea reacts to form polysecondary amides, dicarbamates react to form polyalophanates.

The diketenes also function as cross-linking agents for polyvinyl alcohol. With polyols, such as pentaerythritol infusible resins are formed.

The diketenes are also useful for treating cellulosic materials, including cotton, paper and rayon to reduce their hydrophilic properties. They can be used for surface treatment of wool, silk and nylon.

Although I have described my invention by reference to specific examples, it is apparent that there are many possible modifications in ingredients and procedure and therefore the examples are intended as illustrative and not as limitations.

I claim:

1. Bis-ketenes in which the beta carbon atom of each ketene group is attached by substitution for hydrogen to a nuclear carbon atom of at least one aromatic hydrocarbon group and in which each such beta carbon atom of each ketene group is spaced from the other by a hydrocarbon group selected from the class consisting of the following groups: alkarylene in which each said beta carbon atom is separated from the other by at least two carbon atoms; lower alkylene attached to a nuclear carbon atom of a phenylene group; arylene in which each said beta carbon atom is separated from the other by at least two carbon atoms; cycloalkyl in which each said beta carbon atom is separated from the other by at least two carbon atoms; aliphatic unsaturated groups having at least two carbon atoms; and aliphatic hydrocarbon groups having 4 to 18 carbon atoms.

2. Bis-ketenes in which the beta-carbon atom of each ketene group is attached to a nuclear carbon atom of a monocyclic aromatic group and to an alkarylene group, each of said ketene groups being separated from each other by at least two carbon atoms.

3. Bis-ketenes in which the beta-carbon atom of each ketene group is attached to a nuclear carbon atom of a phenyl group and to a lower alkylene group attached to a nuclear carbon atom of a phenylene group.

4. Bis-ketenes in which the beta-carbon atom of each ketene group is attached to a nuclear carbon atom of a phenyl group and to a methylene group which is attached to a nuclear carbon atom of a phenylene group.

5. Bis-ketenes in which the beta-carbon atom of each ketene group is attached to two aryl groups and in which each ketene group is separated from the other by at least two carbon atoms of an arylene nucleus.

6. Bis-ketenes in which each ketene group is attached to a nuclear carbon atom of an aryl group and to a nuclear carbon atom of a cyclohexyl group and in which one ketene group is separated from the other by at least 2 carbon atoms on the cyclohexyl nucleus.

7. Bis-ketenes in which one ketene group is attached to nuclear carbon atoms of an aryl and an arylene group and the other ketene group is attached to a nuclear carbon atom of said arylene group and to a nuclear carbon atom of a cycloalkyl group.

8. Bis-ketenes in which each ketene group is attached to a nuclear carbon atom of an aryl nucleus and to an aliphatic unsaturated hydrocarbon group having at least 2 carbon atoms.

9. Bis-ketenes in which each ketene group is attached to a nuclear carbon atom of an aryl nucleus and to an aliphatic hydrocarbon group having from 4 to 18 carbon atoms.

10. A bis-ketene of the formula

[structure: anthraquinone-type with =C=O groups at 9,10 positions, and $R_n$ substituents on each ring]

wherein R is an alkyl radical having from 1 to 6 carbon atoms, and $n$ is an integer of from 0 to 4 inclusive.

11. Anthraquinoketene.

12.

[structure: phenyl—C(=C=O)—phenylene—C(=C=O)—phenyl]

13.

[structure: cyclohexyl—C(H)—C(=C=O)—phenylene—C(=C=O)—phenyl, with cyclohexyl shown as $H_2C$, $H_2C$, $CH_2$, $CH_2$, $C H_2$ ring]

14. The method of preparing bis-ketenes comprising dehydrohalogenating a diacyl halide in which the carbon atom alpha to the acyl group is attached by substitution for hydrogen to a nuclear carbon atom of an aromatic hydrocarbon group and to a hydrocarbon group selected from the class consisting of the following groups: alkarylene in which the carbon atom alpha to each acyl group is separated from the other such alpha carbon atom by at least two carbon atoms; lower alkylene attached to a nuclear carbon atom of a phenylene group; arylene in which the carbon atom alpha to each acyl group is separated from the other such alpha carbon atom by at least two carbon atoms; cycloalkyl in which the carbon atom alpha to each acyl group is separated from the other such alpha carbon atom by at least two carbon atoms; aliphatic unsaturated group having at least two carbon atoms; and aliphatic hydrocarbon groups having 4 to 18 carbon atoms, in the presence of a tertiary amine, an inert atmosphere and an inert diluent at a temperature up to about 100° C.

15. The method of preparing bis-ketenes comprising dehydrochlorinating a diacyl chloride in which the carbon atom alpha to the acyl group is attached by substitution for hydrogen to a nuclear carbon atom of an aromatic hydrocarbon group and to a hydrocarbon group selected from the class consisting of the following groups: alkarylene in which the carbon atom alpha to each acyl group is separated from the other such alpha carbon atom by at least two carbon atoms; lower alkylene attached to a nuclear carbon atom of a phenylene group; arylene in which the carbon atom alpha to each acyl group is separated from the other such alpha carbon atom by at least two carbon atoms; cycloalkyl in which the carbon atom alpha to each acyl group is separated from the other such alpha carbon atom by at least two carbon atoms; aliphatic unsaturated group having at least two carbon atoms; and aliphatic hydrocarbon groups having 4 to 18 carbon atoms in the presence of a lower trialkyl amine, an inert atmosphere and an inert diluent at a temperature up to about 100° C.

16. The method of claim 15 in which the diacyl chloride is

[structure: phenyl—CH(COCl)—phenylene—CH(COCl)—phenyl]

the amine is triethyl amine and the diluent is benzene.

17. The method of claim 15 in which the diacyl chloride is

[structure: naphthalene with two CH(COCl) groups]

the amine is triethyl amine and the diluent is benzene.

18. The method of claim 15 in which the diacyl chloride is

[structure: phenyl—CH(COCl)—CH₂—phenylene—CH₂—CH(COCl)—phenyl]

the amine is triethyl amine and the diluent is benzene.

19. The method of claim 15 in which the diacyl chloride is

[structure: cyclohexyl—CH—CH(COCl)—phenylene—CH(COCl)—phenyl]

the amine is triethyl amine and the diluent is benzene.

20. The method of claim 15 in which the diacyl chloride is

[structure: phenyl—CH(COCl)—CH₂—C≡C—CH₂—CH(COCl)—phenyl]

the amine is triethyl amine and the diluent is benzene.

References Cited in the file of this patent

UNITED STATES PATENTS

| | | |
|---|---|---|
| 2,383,863 | Hueter | Aug. 28, 1945 |
| 2,584,664 | Blomquist et al. | Feb. 5, 1952 |

OTHER REFERENCES

Staudinger: Die Ketene, page 12 (1912).

UNITED STATES PATENT OFFICE
CERTIFICATE OF CORRECTION

Patent No. 3,002,024                      September 26, 1961

Alfred T. Blomquist

It is hereby certified that error appears in the above numbered patent requiring correction and that the said Letters Patent should read as corrected below.

Column 3, lines 1 to 8, the formula should appear as shown below instead of as in the patent:

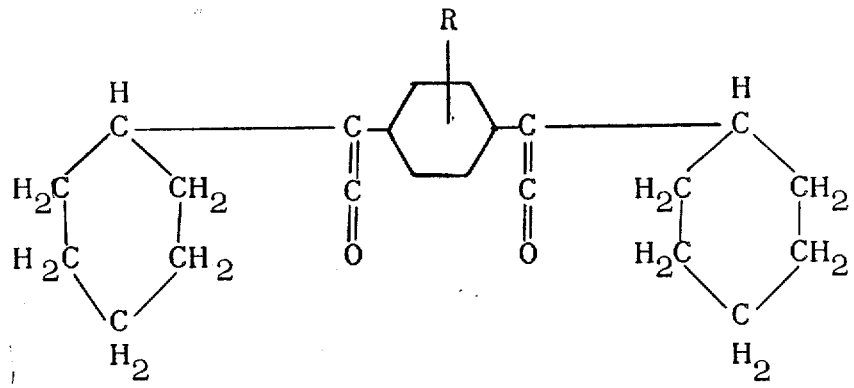

Column 17, lines 49 and 50, for "anthraquino-ketenes" read -- anthraquinoketene --.

Signed and sealed this 21st day of August 1962.

(SEAL)
Attest:

ESTON G. JOHNSON                      DAVID L. LADD
Attesting Officer                   Commissioner of Patents